United States Patent [19]
Yoshida

[11] 4,080,297
[45] Mar. 21, 1978

[54] AUTOMATIC FILTER SCREEN EXCHANGE APPARATUS FOR AN EXTRUDER

[75] Inventor: Minoru Yoshida, Hiroshima, Japan

[73] Assignee: The Japan Steel Works, Ltd., Japan

[21] Appl. No.: 636,152

[22] Filed: Nov. 28, 1975

[30] Foreign Application Priority Data

Feb. 20, 1975 Japan .................................. 50-20372

[51] Int. Cl.² ............................................. B01D 33/00
[52] U.S. Cl. .................................... 210/387; 210/396
[58] Field of Search .............. 210/387, 396, 402, 403, 210/408, 386, 184, 400, 401, 71, 77, 186, 97

[56] References Cited

U.S. PATENT DOCUMENTS

| | | | |
|---|---|---|---|
| 3,276,584 | 10/1966 | Mathewson | 210/402 X |
| 3,330,416 | 7/1967 | Hornbostel | 210/387 |
| 3,471,017 | 10/1969 | Kalman | 210/184 X |
| 3,645,399 | 2/1972 | Kalman | 210/184 X |
| 3,856,680 | 12/1974 | Elmore | 210/184 |
| 3,912,632 | 10/1975 | Winzen | 210/387 X |
| 3,940,335 | 2/1976 | Kalman | 210/184 X |
| 4,010,391 | 3/1977 | Kalman | 210/387 X |

Primary Examiner—Frank W. Lutter
Assistant Examiner—Richard L. Chiesa
Attorney, Agent, or Firm—Robert E. Burns; Emmanuel J. Lobato; Bruce L. Adams

[57] ABSTRACT

A hollow cylindrical breaker drum is rotatable and mounted in a cylindrical chamber of a main body to be connected to the forward end of the extruder and a band-like filter screen is introduced into the cylindrical chamber from the outside through a slit formed in the wall of the main body to be wound around the hollow breaker drum and passed to the outside from the cylindrical chamber through another slit formed in the wall of the main body, whereby the filter screen is adapted to be automatically exchanged by differentiating the thicknesses of both slits.

6 Claims, 4 Drawing Figures

AUTOMATIC FILTER SCREEN EXCHANGE APPARATUS FOR AN EXTRUDER

BACKGROUND OF THE INVENTION

The present invention relates to an extruder, and more particularly to an automatic filter screen exchange apparatus for an extruder.

An automatic filter screen exchange apparatus for an extruder has such a function as well-known in the art that impurities contained in plastic materials to be extruded from the extruder are filtered by the filter screen and when the meshes of the filter screen become clogged by an accumulation of impurities on the screen, the filter screen is then automatically exchanged by a fresh one without necessitating the stopping of the operation of the extruder.

Such an automatic filter screen exchange apparatus for an extruder is usually divided into two types, that is, one a rotary valve type and the other a slide type. However, both types have various defects: in the rotary valve type, such a constitution has been publicly known in which a changeover valve is provided to change flow passages so that filter screens are successively changed from one passage to other. However, such a constitution has generally complicated plastic resin flow passages, resulting in the stay of resin in the passages thereby causing the deterioration of the resin there. Further, since the changeover valve must be rotated under the state of being subjected to a high backpressure of resin within the extruder, the force required for the manipulation of the valve becomes too high.

Therefore, the changeover valve of a large dimension does not allow smooth operation, so that rotary valve type has a fundamental defect that it can be adopted only for extruders of a small limited capacity. On the other hand, in the slide type such a constitution has been widely used on account of its simplicity in construction in which a slide plate arranged at right angles to the axis of the extruder is provided with two sets of breaker plates and filter screens side by side, the slide being adapted so as to be shifted by a fluid cylinder in a direction orthogonal to the axis of the extruder to effect the exchange of the screen filters from one set to other. However, in such a constitution, since it causes a large surface pressure on shifting surfaces to form between the slide plate and a seal ring mounted to the extruder due to the high backpressure of the resin, the shifting of the slide plate during the operation of the extruder is made very difficult. Further, if the slide plate is shifted during the operation of the extruder, a leakage of a large amount of resin occurs momentarily so that a drop in pressure of the resin happens in the extruder, thereby an unevennes is generated in the resin extruded through a die mounted at the forward end of the extruder, resulting in extruded products having poor qualities. In addition, since in the slide type the breaker plate has a circular shape, when it is used for an extruder of a large capacity its thickness becomes naturally thick in terms of strength, so the pressure loss becomes correspondingly large.

SUMMARY OF THE INVENTION

It is an object of the present invention to provide an automatic filter screen exchange apparatus for an extruder which can discard all of the defects as above said inherent to the conventional filter screen exchange apparatuses irrespective of the types.

It is a further object of the present invention to provide an automatic filter screen exchange apparatus for an extruder wherein the exchange of the filter screen can be automatically performed even during the operation of the extruder without causing any pressure change in the resin to be extruded.

Another object of the present invention is to provide an automatic filter screen exchange apparatus for an extruder wherein a filter screen in the form of a plane sheet is utilized as the filter screen and it is automatically and successively moved when the filter screen is exchanged.

Still another object of the present invention is to provide an automatic filter screen exchange apparatus for an extruder in which a breaker plate with which the filter screen cooperates has a hollow cylindrical drum form and allows remarkably less wall thickness than that of a breaker plate in a conventional filter screen exchange apparatus of the slide type.

It is still a further object of the present invention to provide an automatic filter screen exchange apparatus for an extruder in which the length of the respective nozzles formed in the wall of a breaker drum with which the filter screen cooperates is made possible to be long irrespective of the wall thickness of the breaker drum so that the number of the nozzles can be increased as desired which results in less pressure loss compared with conventional filter screen exchange apparatus.

It is also one of the objects of the present invention to provide an automatic filter screen exchange apparatus for an extruder which is compact in shape, excellent in filtering efficiency and easy to handle.

In accordance with the present invention, an automatic filter screen exchange apparatus for an extruder is provided in which a breaker drum having generally a hollow cylindrical form with a plurality of nozzles being formed in its wall is arranged in a main body which is adapted to connect to the forward end of the extruder orthogonal the axis of the extruder and a band-like filter screen is introduced into the main body from the outside through a slit formed in the wall of the main body, wound around the outer periphery of the breaker drum and passed to the outside through another slit formed in the wall of the main body, whereby the resin from the extruder is passed through the filter screen via the nozzles into the inside of the breaker drum, the breaker drum being adapted to be automatically rotated about its cylindrical axis owing to the difference in the plastic resin pressures at both slits within the main body which is caused by differentiating the thicknesses of both slits.

BRIEF DESCRIPTION OF THE DRAWINGS

These and other objects of the present invention will become more readily apparent upon reading the following specification and upon reference to the accompanying drawings, in which.

DESCRIPTION OF THE PREFERRED EMBODIMENT

Figure 1:
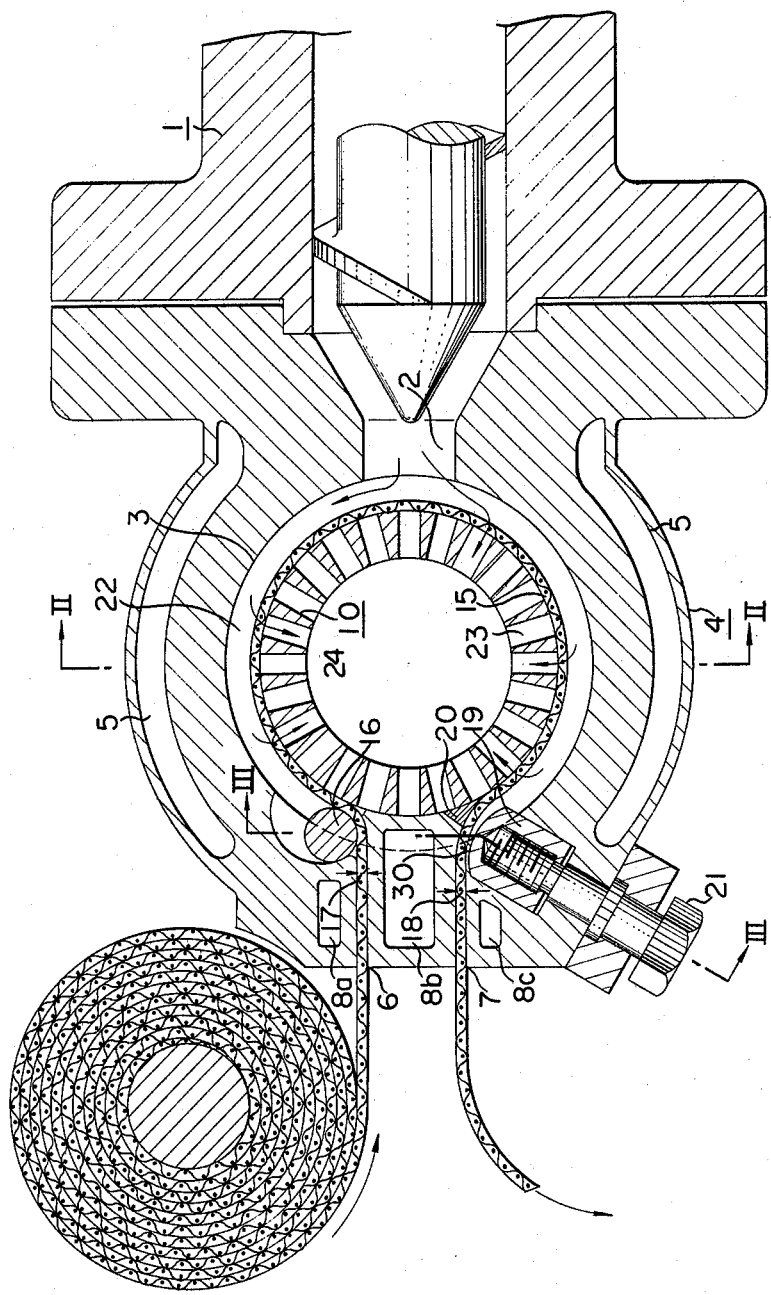
FIG. 1 is an elevational sectional view of a principal portion of a preferred embodiment of an automatic filter screen exchange apparatus for an extruder in accordance with the present invention.
Figure 2:
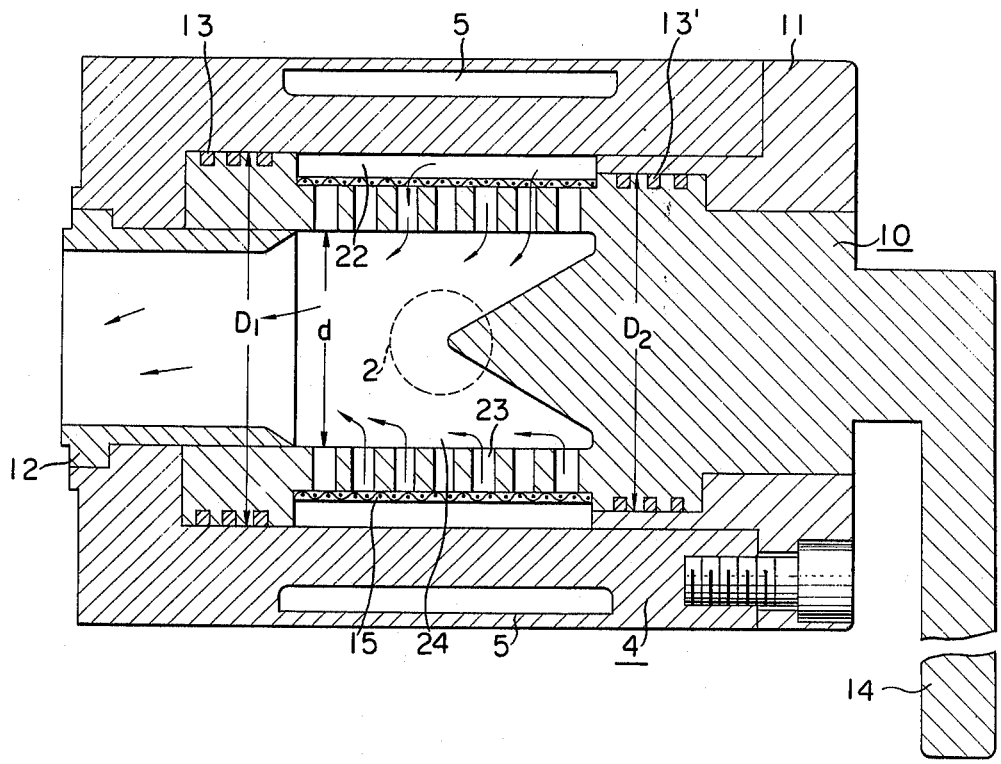
FIG. 2 is a transverse sectional view of the embodiment shown in FIG. 1 taken along the line II—II of FIG. 1.
Figure 3:
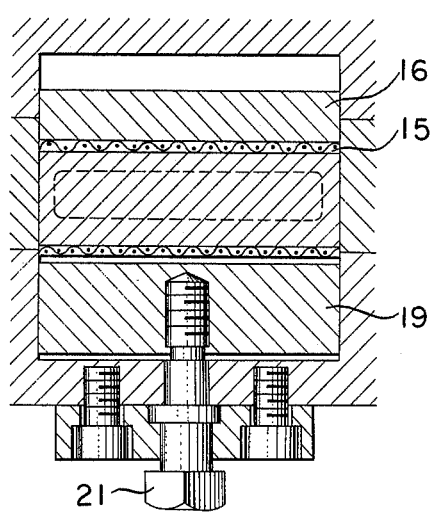
FIG. 3 is a transverse sectional view of the embodiment shown in FIG. 1 taken along the line III—III of FIG. 1.

Referring to FIGS. 1 and 2 of the drawings, there is shown an extruder 1 to the forward end of which is dismountably secured a main body 4 of the apparatus according to the present invention, main body 4 being of substantially a hollow cylindrical shape and its cylindrical hollow chamber 3 is in communication with the cylinder of extruder 1 through an opening 2 drilled in the wall of main body 4 at right angles to its center axis. Main body 4 is surrounded partially by a heating jacket 5 around its outer cylindrical periphery and drilled in its wall, opposite to opening 2 are a pair of slit-like openings 6 and 7 in parallel with each other for the entrance and exit of a filter screen 15, respectively, thereby the wall of main body 4 is provided with cooling jackets 8a, 8b and 8c so as to embrace screen entrance and exit openings 6 and 7. Introduced into cylindrical hollow chamber 3 of main body 4 from one of its opened ends, as shown in FIG. 2, a hollow cylindrical breaker drum 10 which is rotatable and supported at one end within a stepped bore of a side cover 11 that is detachable and mounted at the open end of main body 4 and at the other end rotatable and supported with its bore being disposed on the outer cylindrical surface of an insert seal 12 that is detachable and mounted to main body 4 at the other of its open ends. Breaker drum 10 is provided with a number of seal rings 13, 13' on its outer periphery and at both its end section between which a cylindrical portion having a smaller outer diameter and a substantial length is formed for supporting screen 15. At this point, it will be appreciated that the outer diameters of both ends of the section of the breaker drum 10 are intentionally different as shown in FIG. 2 and $D_1$ and $D_2$, whereby $D_1$ being larger than $D_2$, for a purpose described hereinafter. Breaker drum 10 is further provided with a lever 14 at one end in order to manually rotate it from the outside, if required. As shown in FIG. 1, screen 15 is introduced into the cylindrical hollow chamber 3 of main body 4 from the outside through screen entrance opening 6, drilled in the wall of main body 4 between cooling jackets 8a and 8b, and after screen 15 is guided around a screen presser 16 disposed at the exit section of screen entrance opening 6 within chamber 3 it is wound around substantially the whole outer periphery of breaker drum 10 to be taken out from cylindrical chamber 3 to the outside through screen exit opening 7, drilled in the wall of main body 4 between cooling jackets 8b and 8c. At this point, it will also be appreciated that the thickness 18 of screen exit opening 7 is made larger by several milimeters than that 17 of screen entrance opening 6, and screen 15 is caused to pass through a passage formed between a gap adjusting valve 19 and a scraper 20, both being arranged at the entrance section to screen exit opening 7 within hollow chamber 3 and elongating in parallel with the axis of breaker drum 10. Refer to FIG. 3. In FIGS. 2 and 3 the reference numeral 21 shows an adjusting nut for adjusting valve 19 and 22 shows an upstream side plastic resin flow passage. As can be seen from the drawings a number of nozzle openings 23 are drilled in the wall of breaker drum 10 to be in communication with a downstream side plastic resin flow passage 24 formed within the hollow cylindrical space of breaker drum 10. Thus, the plastic resin within upstream side plastic resin flow passage 22 supplied from extruder 1 through opening 2 under pressure is filtered by screen 15 as the resin is forced to pass through its meshes and supplied into downstream plastic resin flow passage 24 through nozzle orifices 23, thence being flown out from main body 4 through the bore of insert seal 12.

Having been thus explained the constitution of the preferred embodiment of the present invention now its operation will be explained as follows:

Referring firstly to FIG. 1 of the drawings, after screen 15 has been mounted around the outer periphery of breaker drum 10 in the manner as described above, extruder 1 is operated to supply the plastic resin under pressure through opening 2 into upstream side plastic resin flow passage 22 formed in cylindrical hollow chamber 3 of main body 4 between its inner wall and the outside of breaker drum 10 and the plastic resin is thence passed through the meshes of screen 15 to be fed into downstream plastic resin flow passage 24 formed in the bore of breaker drum 10 through nozzle openings 23 drilled in its wall.

In this case, part of the melted plastic resin begins to leak out through screen entrance and exit openings 6 and 7, respectively, but, when the extruder has then stopped its operation and the melted plastic resins beginning to leak out through openings 6 and 7 are cooled by a cooling medium which is circulating through cooling jackets 8a, 8b and 8c, the plastic resins are solified there, and once this has occurred, since the solified plastic resin has very poor heat conductivity, any further leakages of the melted plastic resins through openings 6 and 7 are effectively prevented by the solidified plastic resins by continuously cooling said opening 6 and 7 and by the cooling medium being circulated through cooling jackets 8a, 8b and 8c in order to keep the plastic resins there solidified. Thereafter the operation of extruder 1 is recommenced. In this case, screen presser 16 is pressed down by the pressure of the plastic resin within upstream side plastic resin flow passage 22 to apply force to screen 15 so as to urge it on the outer periphery of breaker drum 10 in the manner as shown in FIG. 1 and at the same time it also serves to assist the prevention of the plastic resin from leaking through screen entrance opening 6. It should also be noticed that gap adjusting valve 19 has previously set through the manipulation of adjusting bolt 21 in such a manner that the gap formed between its outer periphery and the outer surface of scraper 20 which has a curvature substantially corresponding to the outer periphery of gap adjusting valve 19 substantially corresponds to the thickness of screen 15. During the operation of extruder 1 under the states of screen presser 16, gap adjusting valve 19 and scraper 20 as abovementioned, different plastic resin pressures occur in upstream and downstream plastic resin passages 22 and 24, respectively. That is, as viewed in FIG. 2 in downstream plastic resin flow passage 24 formed in the bore of breaker drum 10 there is established a pressure corresponding to a pressure drop which occurs when the plastic resin within it is forced to be extruded through nozzles of a die not shown which is to be mounted at the downstream of insert seal 12, thereby breaker drum 10 is always urged to the right hand direction as viewed in FIG. 2. On the other hand, in upstream plastic resin flow passage 22 there is always established a force urging breaker drum 10 to the left hand direction as viewed in FIG. 2 because of the fact that the outer diameters $D_1$ and $D_2$ of the both ends of breaker drum 10 are differentiated in such a manner that the former $D_1$ is larger than the latter $D_2$. Now the condition in which the pressure applied to breaker drum 10 in the opposite directions as above said is equalized when the plastic resin pressure in upstream plastic resin flow passage 22 varies is given by a formula as follows:

$\pi/4 \times d^2 \times$ (plastic resin pressure in downstream side flow passage 24) $= \pi/4 \times (D_1^2 - D_2^2) \times$ (plastic resin pressure in upstream side flow passage 22)

wherein $d$ is the inner diameter of the bore of breaker drum 10.

Figure 4:
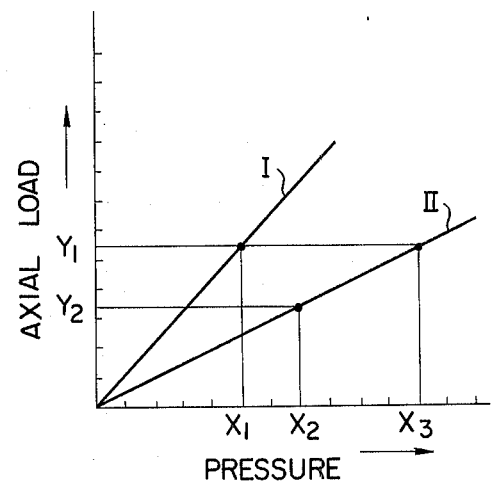
FIG. 4 is a diagram showing the axial load applied to the breaker drum relative to the plastic resin pressure in the plastic resin flow passages at its upstream and downstream sides.

This relation is also represented diagrammatically in FIG. 4 wherein the ordinate and the absissa represent the axial load applied to breaker drum 10 and the plastic resin pressure in upstream or downstream plastic resin flow passage 22 or 24, respectively, and the straight lines I and II respectively represent the relations of the axial load with the plastic resin pressure in upstream and downstream plastic resin flow passages 22 and 24.

As will be apparent from FIG. 4, at the start of the operation of extruder 1 plastic resin pressure $X_1$ in downstream plastic resin flow passage 24 applies to breaker drum 10 axial load $Y_1$ in the right hand direction as viewed in FIG. 2, whereas plastic resin pressure $X_2$ in upstream plastic resin flow passage 22 applies to breaker drum 10 axial load $Y_2$ in the left hand direction as viewed in FIG. 2, and since load $Y_1$ is larger than load $Y_2$ the axial loads applied to breaker drum 10 cannot be equilibrated so that the rotation of breaker drum 10 is made difficult. However, as the operation of extruder 1 continues and the meshes of screen 15 are clogged as a result of the accumulation of impurities contained in the plastic resin on screen 15, the plastic resin pressure in upstream side plastic resin flow passage 22 gradually increases till the maximum pressure $X_3$ reaches, whereupon the axial load applied to breaker drum 10 in the left hand direction as viewed in FIG. 2 becomes also $Y_1$ so that the axial loads applied to breaker drum 10 become equilibrated in both directions as shown in FIG. 4. At this state when adjusting bolt 21 is manipulated to create a gap between the outer surfaces of adjusting valve 19 and scraper 20 and larger than the thickness of screen 15, since screen entrance and exit openings 6 and 7 have been previously sealed by the solified plastic resins as abovementioned, the melted plastic resin enters the clearance 30 formed between the underside of screen 15 and the outer periphery of adjusting valve 19. In this case, since the thickness 18 of screen exit opening 7 which is subjected to the maximum plastic resin pressure $X_3$ is made larger than the thickness 17 of screen entrance opening 6 by several milimeters as abovesaid, screen 15 is applied force acting in the direction of screen exit opening 7 so that screen 15 is thrust towards such a direction. Thus, breaker drum 10 is also subjected to a torque in the same direction due to the frictional force acting between the under surface of screen 15 and the outer periphery of breaker drum 10 so that breaker drum 10 and screen 15 are caused automatically to rotate simultaneously, thereby the exchange of screen 15 from the clogged one to a new one takes place automatically without causing any pressure change in the plastic resin at the die mounted to the forward end of extruder 1 even though the exchange takes place during the operation of extruder 1, and upon completion of the exchange of screen 15 when gap adjusting valve 19 is fastened again screen 15 is held between valve 19 and scraper 20, stopping its movement together with breaker drum 10 and the operation of extruder 1 is continued with a new screen 15 being prepared for filtering the melted plastic resin.

While a preferred embodiment of the present invention was described and illustrated herein it will be understood that modifications may be made without departing from the spirit of our invention.

What is claimed is:

1. An automatic filter screen exchange apparatus for an extruder, comprising: a main body having generally a hollow cylindrical chamber therein open at one end of said main body, a hollow breaker drum rotatable and mounted in said hollow cylindrical chamber of said main body and dimensioned to define an upstream flow passage between its outer periphery and the inner surface of said hollow cylindrical chamber, said breaker drum having a generally cylindrical shape and a number of nozzle openings formed in its wall for providing communication between the upstream flow passage and the interior of said hollow breaker drum, an inlet port through a side of said main body for injecting extruded material to be filtered into the upstream flow passage, a filter screen entrance opening formed through the wall of said main body and extending substantially in parallel with the axis of said breaker drum, a filter screen exit opening formed through the wall of said main body proximate said filter screen entrance opening and extending substantially in parallel with the axis of said breaker drum and said filter screen entrance opening and being spaced a distance therefrom, and a filter screen extending into said hollow cylindrical chamber from the outside through said filter screen entrance opening and wound circumferentially around substantially the entire circumference of said breaker drum and passing to the outside of said main body through said filter screen exit opening wherein the bore of said breaker drum forms a downstream flow passage for receiving filtered material from said filter screen and into the downstream flow passage via said nozzle openings, and wherein the outer diameter of said breaker drum is made smaller at its mid section for a substantial axial length than both end sections with said filter screen wound about the section of said breaker drum having a smaller diameter, and wherein the outer diameters of said end sections are different from each other.

2. An automatic filter screen exchange apparatus for an extruder as claimed in claim 1, wherein a filter screen presser is provided within said hollow cylindrical chamber at the exit side of said filter screen entrance opening into said hollow cylindrical chamber and a gap adjusting valve is provided within said main body at the inlet side of said filter screen exit opening from said hollow cylindrical chamber, said gap adjusting valve being associated with a scraper disposed in said hollow cylindrical chamber in confronting relation therewith so as to put said filter screen therebetween.

3. An automatic filter screen exchange apparatus for an extruder as claimed in claim 2, wherein cooling jackets are provided in the wall of said main body so as to surround said filter screen entrance opening and said filter screen exit opening.

4. An automatic filter screen exchange apparatus for an extruder as claimed in claim 1, wherein said breaker drum is rotatable and mounted in said hollow cylindrical chamber of said main body at one end by being rotatable and supported within a stepped bore of a side cover that is detachable and mounted to said main body and at other end by being rotatable and supported with its bore being disposed on the outer cylindrical surface of an insert seal that is detachable and mounted to said main body.

5. An automatic filter screen exchange apparatus for an extruder as claimed in claim 1, wherein said both end sections of said breaker drum are respectively provided with a number of means defining seals for preventing leakage of material at the end sections of said breaker drum.

6. An automatic filter screen exchange apparatus for an extruder as claimed in claim 1, wherein said hollow breaker drum includes an external lever for manually rotating said hollow breaker drum therewith.

* * * * *